United States Patent
Pronkine et al.

(10) Patent No.: US 11,517,948 B2
(45) Date of Patent: Dec. 6, 2022

(54) BASIN AND HIGH SPEED AIR SOLUTION

(71) Applicant: Siemens Healthcare Diagnostics Inc., Tarrytown, NY (US)

(72) Inventors: Viatcheslav Pronkine, Palisades, NY (US); Dimitri Shishkin, Whippany, NJ (US); Shriram Patel, Saddle Brook, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 990 days.

(21) Appl. No.: 16/319,247

(22) PCT Filed: Jul. 19, 2017

(86) PCT No.: PCT/US2017/042916
§ 371 (c)(1),
(2) Date: Jan. 18, 2019

(87) PCT Pub. No.: WO2018/017752
PCT Pub. Date: Jan. 25, 2018

(65) Prior Publication Data
US 2019/0275570 A1 Sep. 12, 2019

Related U.S. Application Data

(60) Provisional application No. 62/365,230, filed on Jul. 21, 2016.

(51) Int. Cl.
*B08B 9/08* (2006.01)
*B08B 5/02* (2006.01)
(Continued)

(52) U.S. Cl.
CPC ............ *B08B 9/0813* (2013.01); *B08B 3/102* (2013.01); *B08B 5/02* (2013.01); *B08B 9/00* (2013.01);
(Continued)

(58) Field of Classification Search
CPC ......... B08B 9/0813; B08B 3/102; B08B 5/02; B08B 9/00; B08B 2209/08; G01N 35/1004
See application file for complete search history.

(56) References Cited

U.S. PATENT DOCUMENTS 5,270,210 A 12/1993 Weyrauch et al.
5,408,891 A 4/1995 Barber et al.
(Continued)

FOREIGN PATENT DOCUMENTS

CA 2239974 A1 2/1997
CN 2924086 Y 7/2007
(Continued)

OTHER PUBLICATIONS

NPL-1 https://www.amazon.com/FFR-Merchandising-Metal-C-Clamp-Bracket/dp/B011OYJZ4M?th=1 (Year: 2015).*
(Continued)

*Primary Examiner* — Michael E Barr
*Assistant Examiner* — Pallavi Chitta (57) ABSTRACT

One embodiment provides a rinse basin and blower system configured to clean a pipette including: a rinse basin comprising: a hollow tube enclosed at one end; wherein the hollow tube comprises an upper port and a lower port; and the lower port being tapered toward the hollow tube; and wherein the rinse basin is connected to a blower system; the blower system comprising: a waste reservoir that receives, from the rinse basin, a waste product comprising: air and liquid, wherein the waste reservoir separates the liquid from the air; a dryer that receives the air from the waste reservoir and further separates any remaining liquid from the air; and a blower that receives the air from the dryer and exhausts the air.

14 Claims, 9 Drawing Sheets

(51) Int. Cl.
*G01N 35/10* (2006.01)
*B08B 9/00* (2006.01)
*B08B 3/10* (2006.01)

(52) U.S. Cl.
CPC ...... *G01N 35/1004* (2013.01); *B08B 2209/08* (2013.01)

(56) References Cited

U.S. PATENT DOCUMENTS

| | | | |
|---|---|---|---|
| 5,468,453 A | | 11/1995 | Holt et al. |
| 5,730,163 A | * | 3/1998 | Meyer ................ B08B 5/02 |
| | | | 134/108 |
| 7,300,525 B2 | | 11/2007 | Furst et al. |
| 2005/0074363 A1 | * | 4/2005 | Dunfee ............ G01N 35/1079 |
| | | | 422/81 |
| 2008/0154543 A1 | | 6/2008 | Rajagopal et al. |
| 2009/0032065 A1 | | 2/2009 | Bantz et al. |
| 2009/0095322 A1 | | 4/2009 | Wakao et al. |
| 2014/0083466 A1 | | 3/2014 | Sales, Jr. et al. |
| 2014/0318574 A1 | | 10/2014 | Safavi et al. |

FOREIGN PATENT DOCUMENTS

| | | | | |
|---|---|---|---|---|
| CN | 101485938 A | | 7/2009 | |
| CN | 103620355 A | | 3/2014 | |
| CN | 203578303 U | | 5/2014 | |
| EP | 0 725 279 A1 | | 8/1996 | |
| EP | 0725279 A1 | * | 8/1996 | |
| JP | H06-222065 A | | 8/1994 | |
| JP | H07-229905 A | | 8/1995 | |
| JP | H08-248035 A | | 9/1996 | |
| JP | 2004105817 A | * | 4/2004 | |
| JP | 2007-534890 A | | 11/2007 | |
| JP | 2008147386 A | * | 6/2008 | ............ B08B 15/00 |
| JP | 2010-513928 A | | 4/2010 | |
| WO | 2011/004581 A1 | | 1/2011 | |

OTHER PUBLICATIONS

PCT International Search Report and Written Opinion dated Sep. 29, 2017 (7 Pages).
Extended EP Search Report dated Jun. 12, 2019 of corresponding European Application No. 17831818.4, 5 Pages.

* cited by examiner

BASIN AND HIGH SPEED AIR SOLUTION

CROSS REFERENCE TO RELATED APPLICATION

This application claims the benefit of U.S. Provisional Application Ser. No. 62/365,230 filed Jul. 21, 2016, which is incorporated herein by reference in its entirety.

TECHNOLOGY FIELD

The present invention relates generally to a basin used to remove residual reagent from testing equipment.

BACKGROUND

Testing systems generally require clearly defined reproducible results. However, due to the nature/scale of testing labs, the style and type of tests being carried out can vary greatly. This can lead to a large range of substances (e.g., chemicals) being introduced to various other substances or environments. In order to carry out these experiments (e.g., mixing reagents with patient sample fluids), a device or apparatus is required to interact with at least one substance. Typically, when a substance (e.g., a reagent or sample) is introduced to a new system, it is preferable to have the introduction carried out in the cleanest, most reproducible environment possible.

Ensuring a sterile environment can be difficult when dealing with a large volume of testing scenarios, particularly when many of the instruments are reused repeatedly. Thus, in order to maintain a proper experiment, the tools and instruments used for testing various reagents must be properly cleaned prior to being used in a separate experiment. However, this cleaning process can be slow and/or ineffective, delaying the testing process and potentially having negative effects on the results. If the instruments are not cleaned properly, the results may be tainted and, thus, less reliable or non-useable. This, in turn, costs a laboratory money.

Thus, there is a need for a quicker, more efficient, and more robust method of cleaning testing instruments.

SUMMARY

Embodiments are directed to systems and methods for reducing reagent, sample, and water carryover in analytical testing.

Accordingly, an embodiment provides a blower system configured to clean a pipette comprising: a rinse basin configured to receive the pipette comprising: a hollow tube enclosed at one end; wherein the hollow tube comprises an upper port and a lower port; the lower port being tapered toward the hollow tube; and wherein the rinse basin is connected to a blower system; the blower system comprising: a waste reservoir that upon receiving a waste product comprising: air and liquid, separates the liquid from the air; a dryer that receives the air from the waste reservoir and further separates any remaining liquid from the air; and a blower that receives the air from the dryer and exhausts the air.

A further embodiment provides a rinse basin and blower system configured to clean a pipette comprising: a rinse basin comprising: a hollow tube enclosed at one end; wherein the hollow tube comprises an upper port and a lower port; the lower port being tapered toward the hollow tube; and wherein the rinse basin is connected to a blower system; the blower system comprising: a waste reservoir that receives, from the rinse basin, a waste product comprising: air and liquid, wherein the waste reservoir separates the liquid from the air; a dryer that receives the air from the waste reservoir and further separates any remaining liquid from the air; and a blower that receives the air from the dryer and exhausts the air.

Another embodiment provides a method of reducing reagent and water carryover in analytical testing, the method comprising: inserting an apparatus to be cleaned into a rinse basin, the rinse basin comprising: a hollow tube enclosed at one end; wherein the hollow tube comprises an upper port and a lower port; the lower port being tapered in the direction of the hollow tube; cleaning the apparatus, comprising blowing, using a valve, air into the lower port of the rinse basin, extracting, from the upper port, a waste product comprising liquid and air, wherein the waste product is forced upward through the rinse basin by the air; transporting, using a tubular system, the waste product to a waste reservoir; separating, using the waste reservoir, air from liquid, wherein the air is then transported to a dryer; drying, using the dryer, the air from the waste reservoir to further separate any remaining liquid from the air; and exhausting, using a blower, the dried air from the dryer.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Embodiments herein are directed to an aperture (e.g., a rinse basin, tube, housing, etc.) and high speed air solutions, which can be used for cleaning various chemicals, reagents, or substances off of test equipment. For simplicity purposes, reference may be made herein to the aperture and high speed air system as a rinse basin and blower respectively. It should be understood that this is simply to make the disclosure material more easily understood. However, as one skilled in the art would recognize, various methods of apertures and high speed air flow systems could be used in a similar manner. Advantageously, the rinse basin and blower solution provides for easy and robust cleaning mechanisms to ensure quick, efficient, and safe cleaning of devices.

As discussed herein, the ability to consistently remove any residual reagent after a reagent is dispensed is very important to maintain proper experiment conditions. Similarly, residual wash after a rinse, which may remain on devices (e.g., pipette probe tips) should be removed to further reduce reagent and water carryover, thereby improving the precision of analytical test results carried out in quick succession. Previously, the cleaning process was performed using a different basin design that utilized a vacuum source to remove remaining reagent and clean the probes. However, this method can be slow and ineffective.

Figure 1:
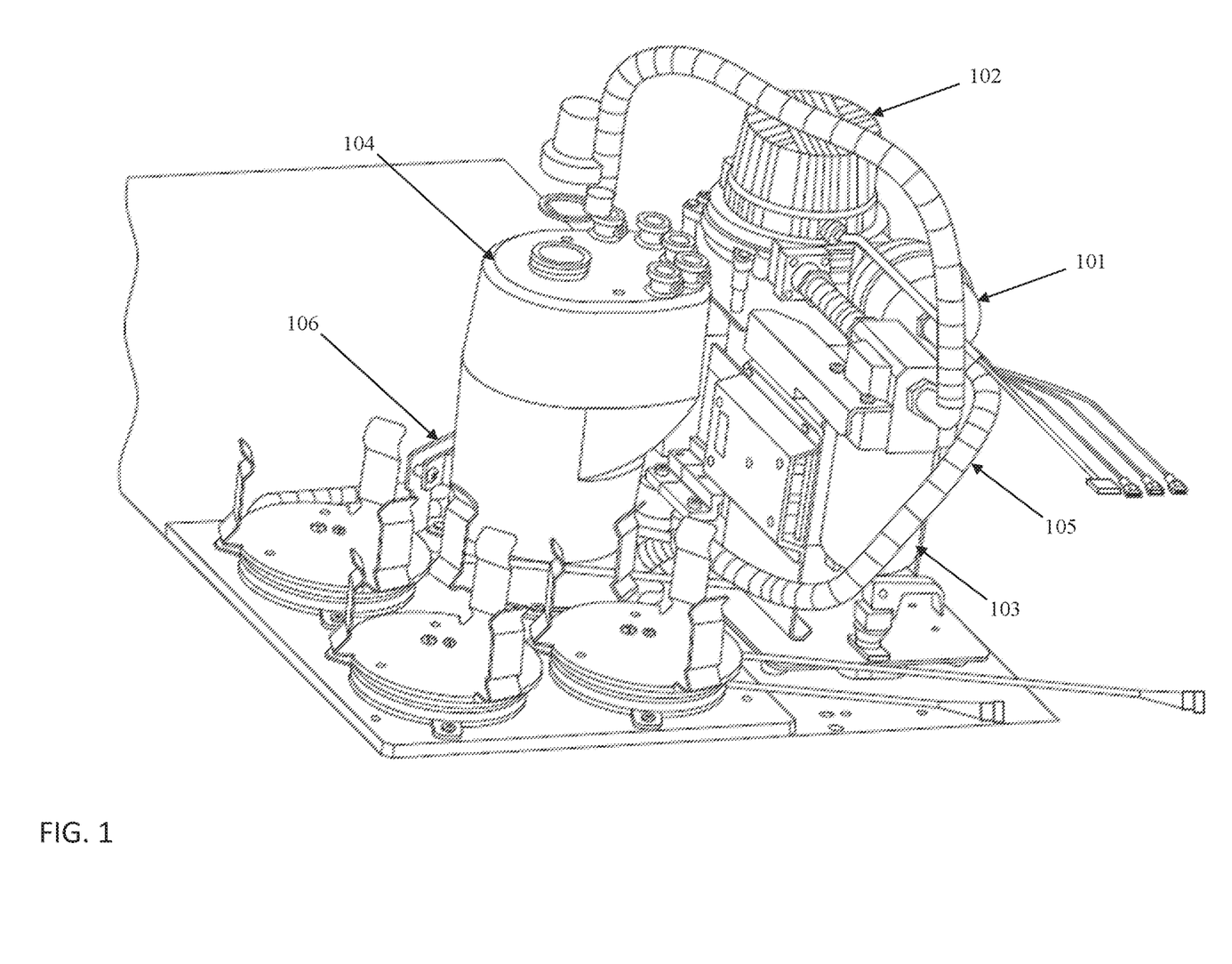
FIG. 1 is an illustrative view of an example rinse basin and blower system.
Figure 2:
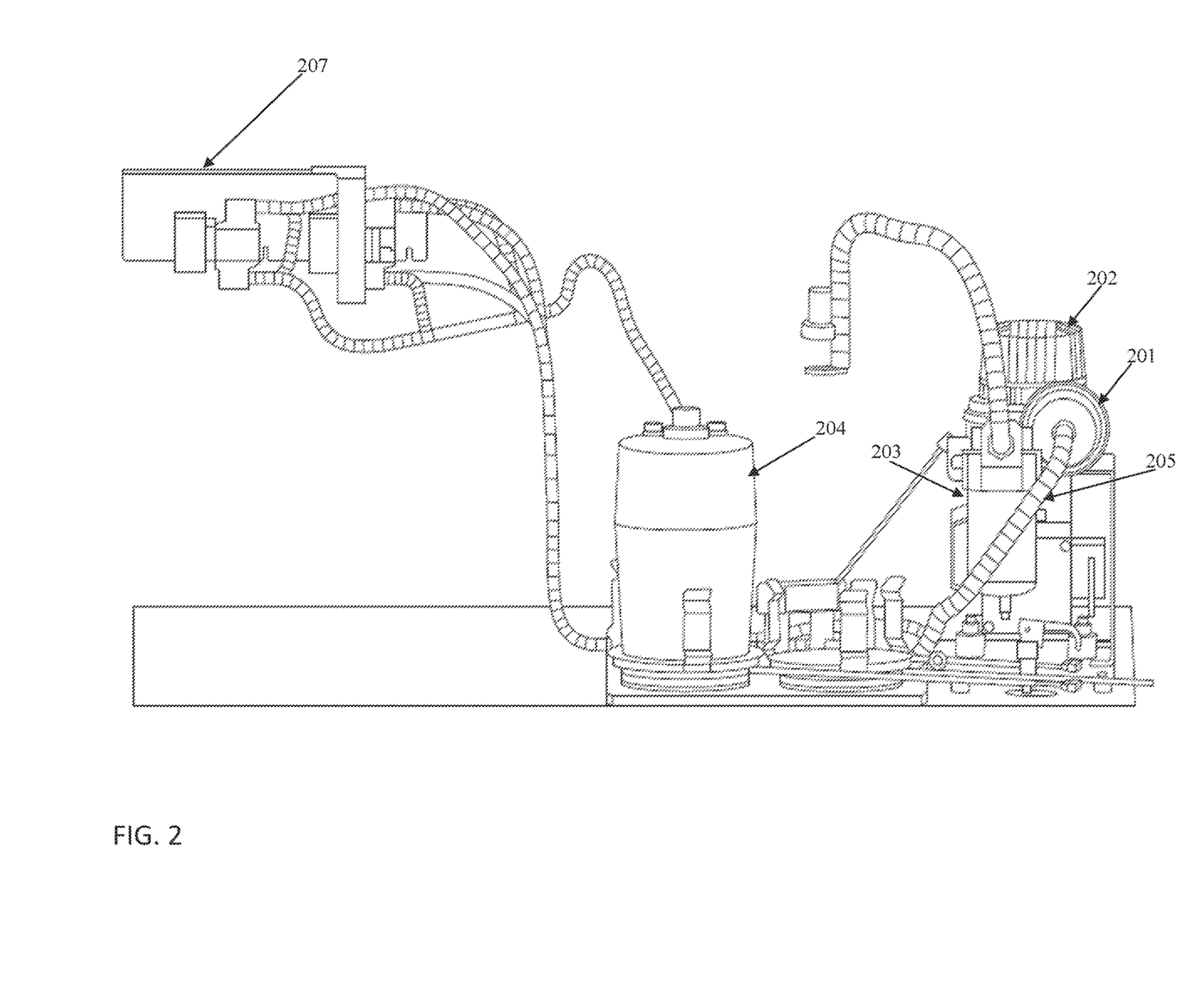
FIG. 2 is an illustrative view of another example rinse basin and blower system.
Figure 3:
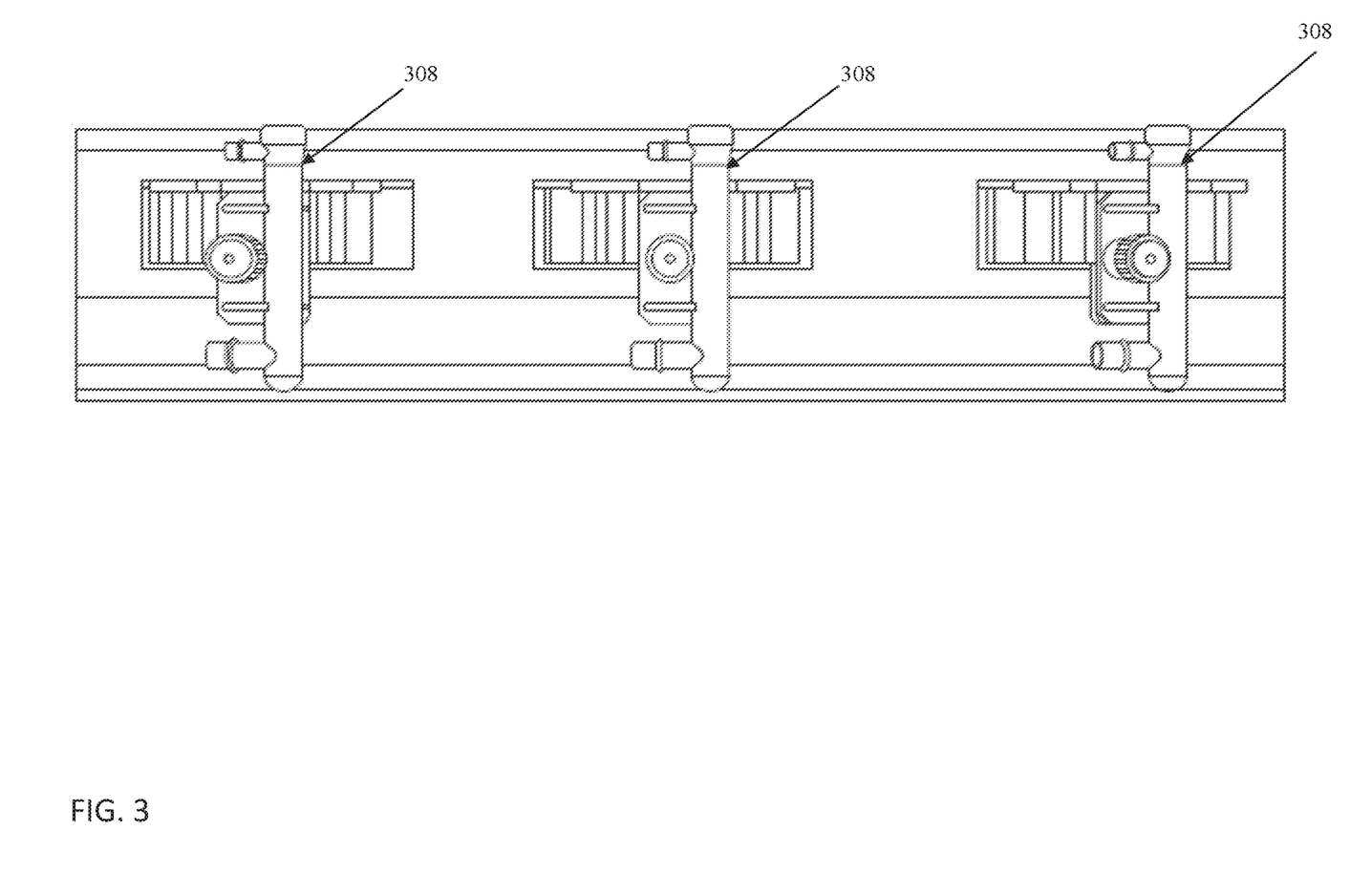
FIG. 3 is an illustrative view of an example of a plurality of rinse basins.

Accordingly, an embodiment provides an improvement via a system having a rinse basin and a high speed air system (e.g., a blower, a jet turbine, high speed vacuum, a molecular pump, etc.). A non-limiting example of the improved system is shown in FIGS. 1-3. Referring briefly to FIG. 1, an example embodiment is shown wherein the system may have at least one silencer and/or filter 101, at least one high speed air system (e.g., blower) 102, at least one dryer 103, at least one waste reservoir 104, at least one exhaust tube 105, and at least one capacitive sensor 106. Further embodiments, as shown in FIG. 2, may comprise at least one waste transfer pump 207, at least one valve (not shown), at least one rinse basin (not shown), and various tubing and sensor assemblies (e.g., silencer 201, at least one high speed air system 202, at least one dryer 203, at least one waste reservoir 204, at least one exhaust tube 205, etc.).

In some embodiments, a high speed air system 102, such as that shown in FIG. 1, may be set to a constant air speed. In additional or alternative embodiments, the air speed of a high speed air system 102 may be variable based on user preference and/or system conditions. In further embodiments, the system may have monitoring devices placed in various locations to measure performance (e.g., a capacitance sensor 106). For example, the speed may need to be set at a constant rate in order to provide the necessary air flow to the one or more rinse basins. In some embodiments, the basins may be arranged in a group or line in order to more easily clean multiple testing devices at one. For example, as that shown in FIG. 3, three apertures 308 are shown. As shown each aperture is mounted using an individual bracket, but in some embodiments, a universal bracket mounting system may be used to have multiple apertures in the same bracket.

Figure 4:
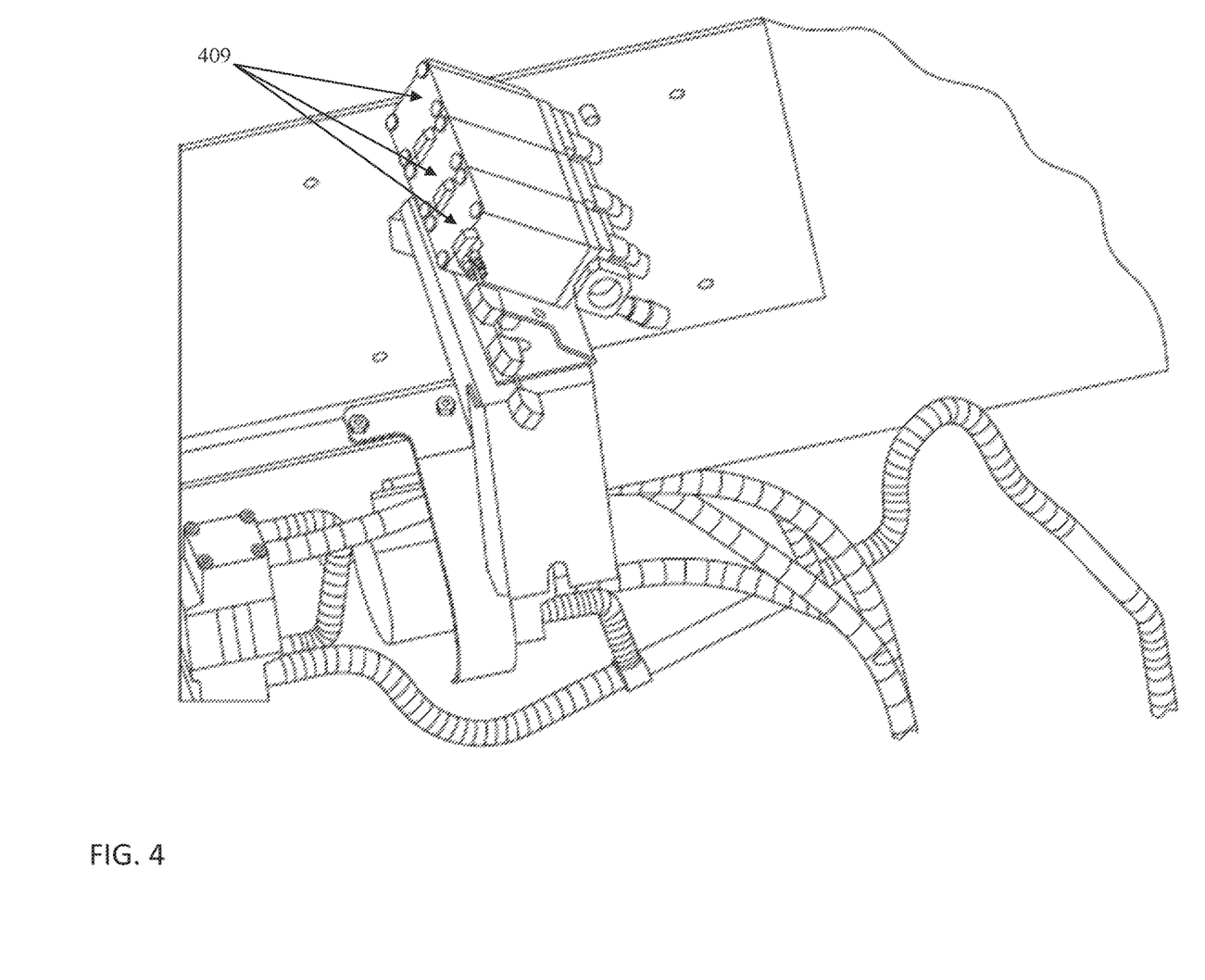
FIG. 4 is an illustrative view of an example rinse basin valve system.
Figure 5:
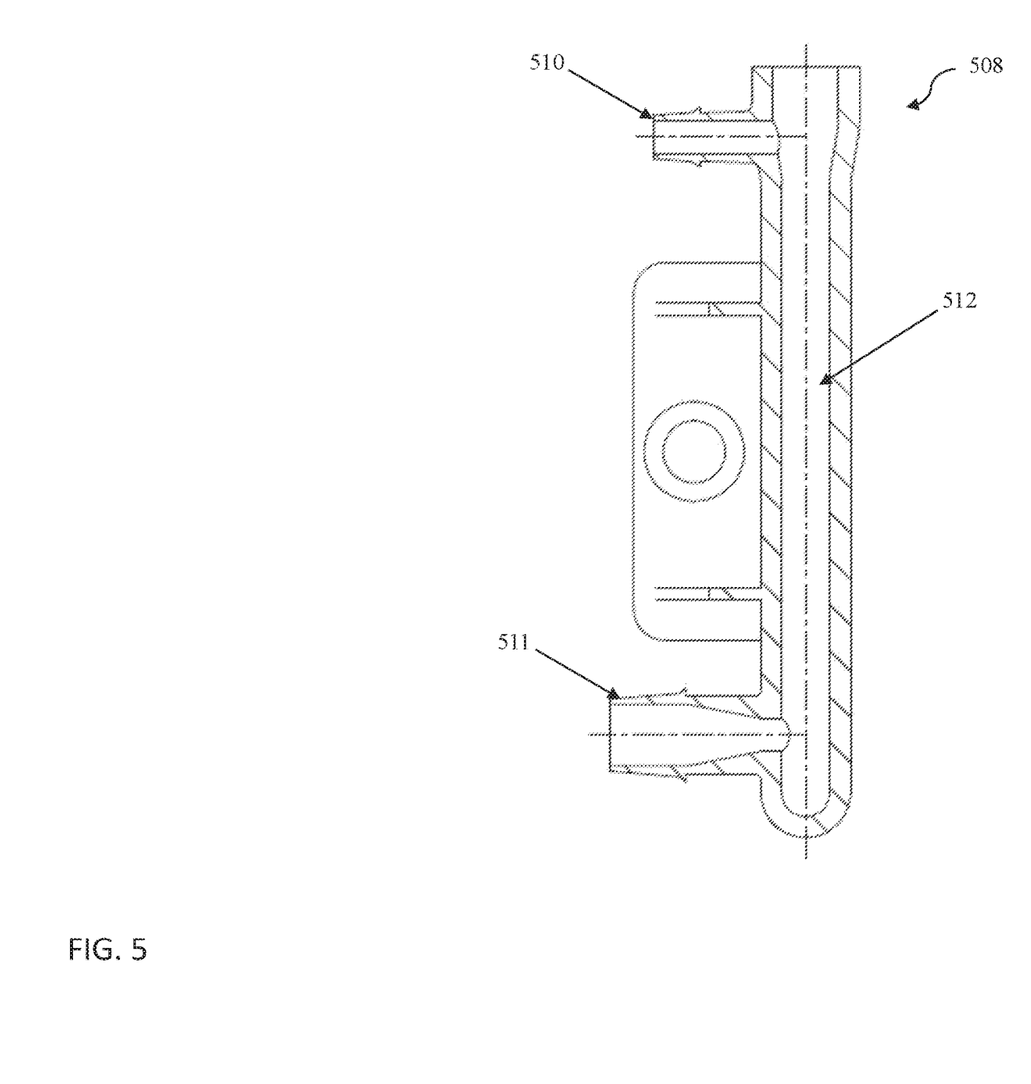
FIG. 5 is an illustrative cutaway view of an example rinse basin.

In one embodiment, such as that shown in FIG. 4, the air flow to the rinse basin(s) may be applied (e.g., constantly or variably), utilizing one or more valves 409. The valves may be set up in a normally open configuration or, alternatively, in a normally closed configuration. In another embodiment, such as that shown in FIG. 5, the top port 510 of the rinse basin 508 may be valved. Thus, air may be continuously flowing at all times. This allows an embodiment to prevent the one or more rinse basins from overflowing. Referring to FIG. 5, an embodiment may draw/pull liquid from of the top port 510 as the basin fills up. Additionally, as shown in FIG. 5, the bottom port 511 may be tapered, which can help prevent liquid from exiting via the bottom port (e.g., when liquid is dispensed out the probe). In a further embodiment, the taper of the lower port 511 allows the liquid to go up center channel 512 of the rinse basin, allowing the device or instrument (e.g., an external probe) to be cleaned.

Figure 6:
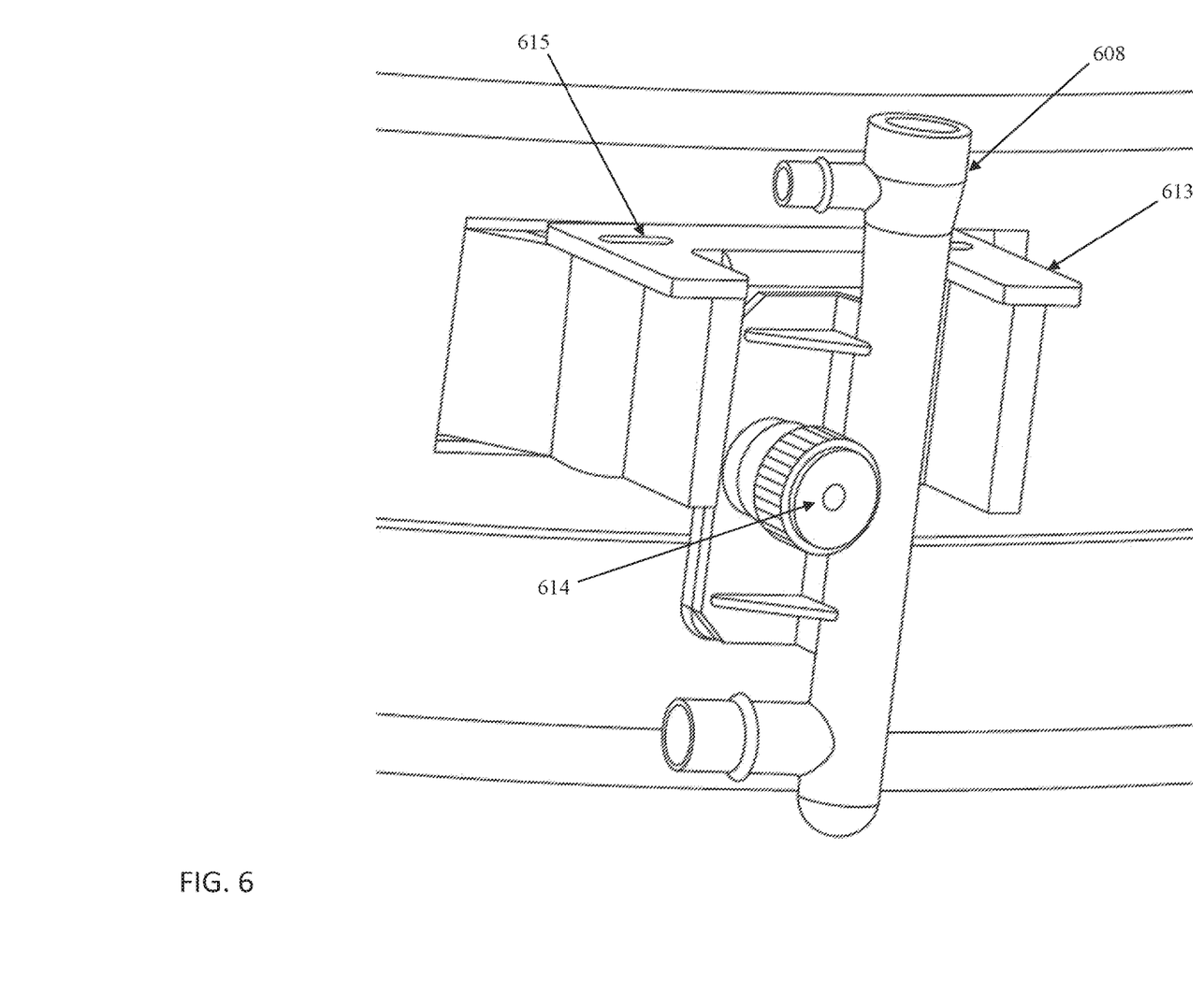
FIG. 6 is an illustrative view of an example rinse basin and bracket.
Figure 7:
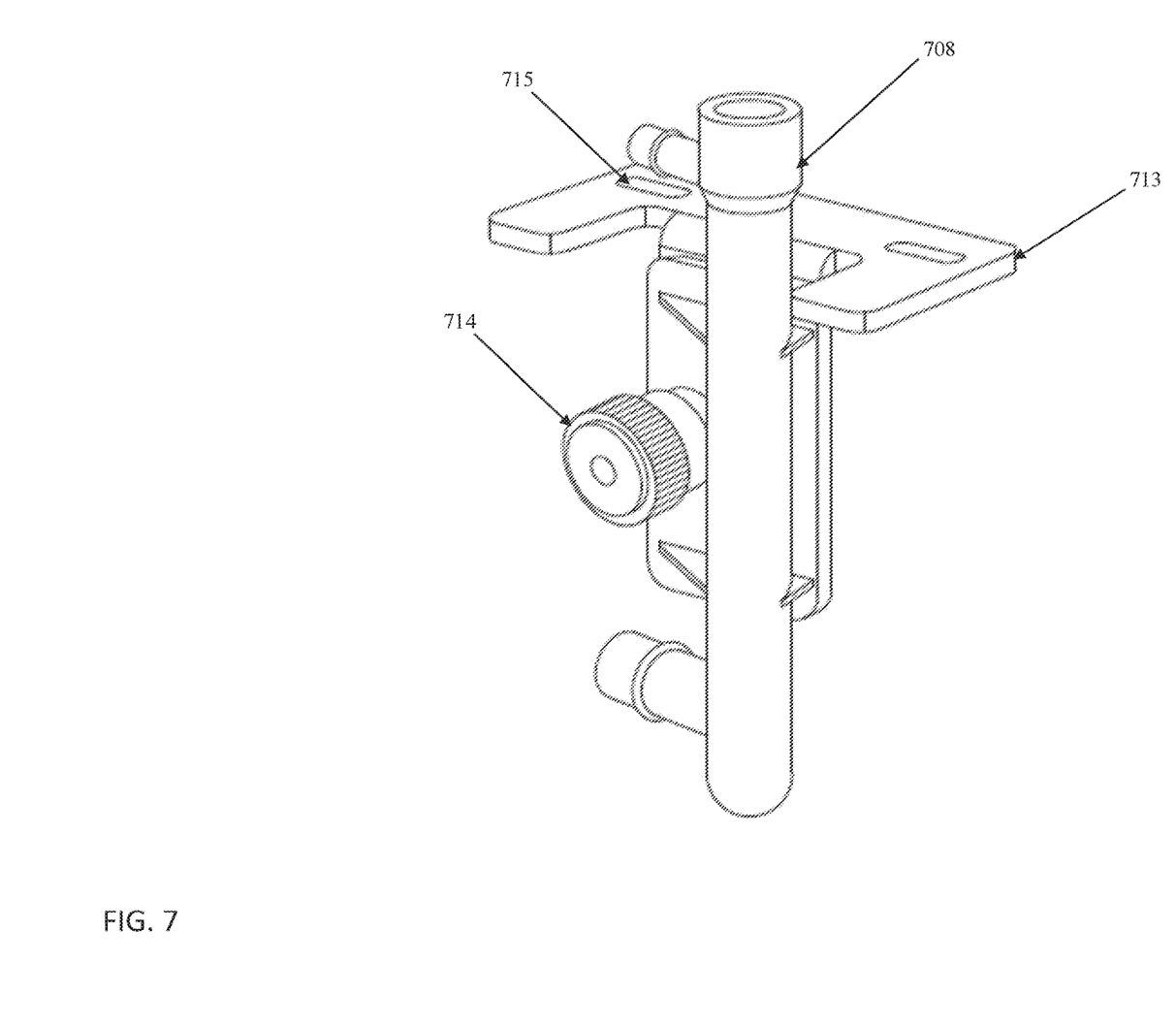
FIG. 7 is an illustrative view of another example rinse basin and bracket.

Referring to FIGS. 6 and 7, a non-limiting example embodiment involving a bracket system 613/713 is shown. For simplicity and explanatory purposes, the bracket 613/713 may be referred to herein as metal or sheet metal. However, it should be understood by those skilled in the art that various bracket materials may be used (e.g., plastic, carbon fiber, various metals/metal alloys, etc.). In one embodiment, the sheet metal bracket 613/713 on the rinse basin 608/708 may allow for tight control of the ninety (90) degree bend that may be needed to properly orient the wash basin vertically. In some embodiments, the angle control can be accomplished using a fastening device 614/714 (e.g., loosening the threads of the fastening device rotating the bracket and tightening the fastening device). In further embodiments, slots or grooves 615/715 in the sheet metal may allow for horizontal alignment adjustments (e.g., once the basin is in place).

In one embodiment, valves and tubes may have a larger inner diameter (ID), allowing more air flow within the basin, and to help prevent any air flow restrictions as fluid is moving through the basin. In another embodiment, the air flow is being pumped through the rinse basin(s), which have probes substantially centered within them. Having the probes as close to center as possible may be important for an embodiment as it helps to reduce reagent and water carryover to the next experiment.

Figure 8:
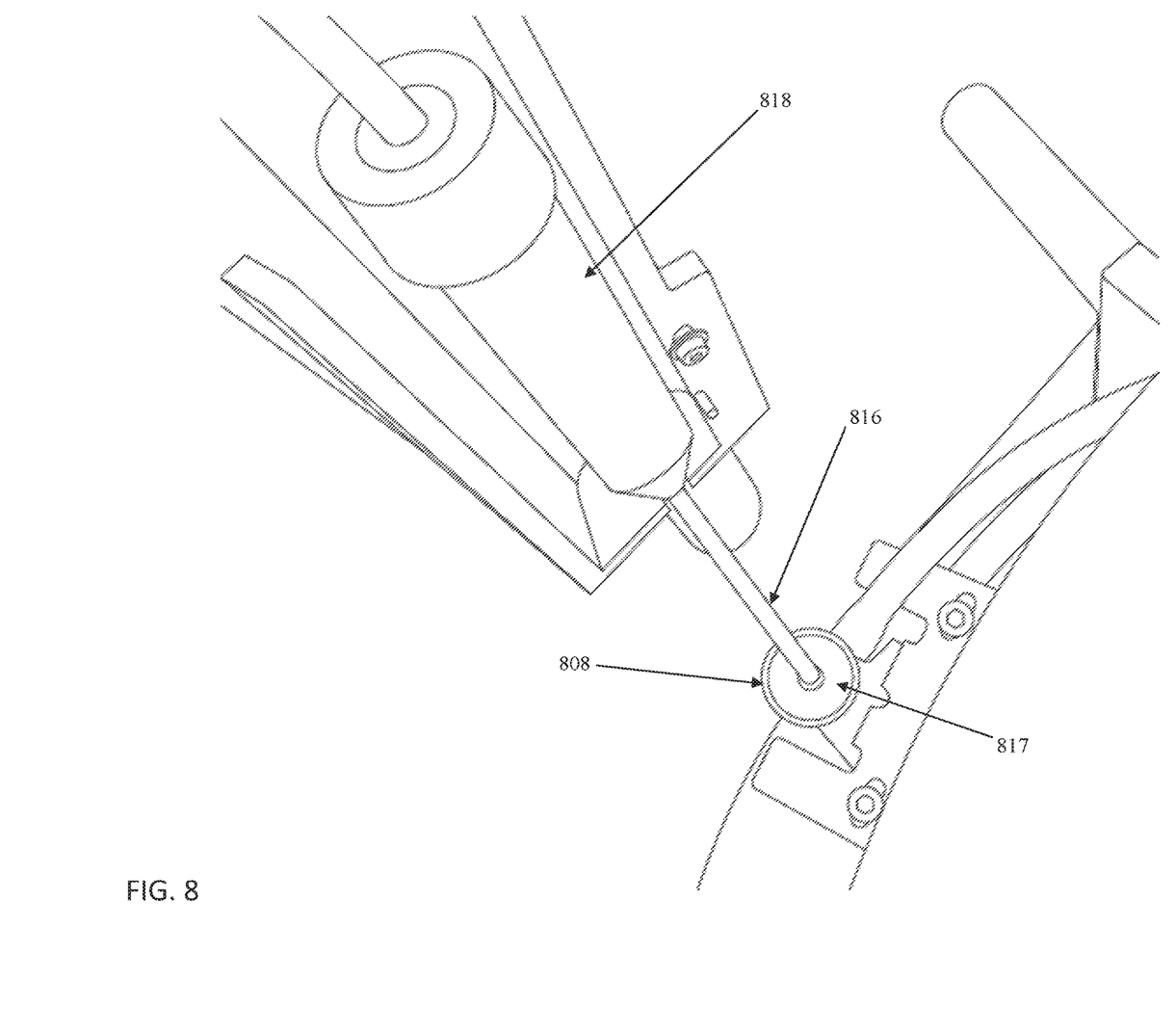
FIG. 8 is an illustrative view of an example mechanical alignment check system.

Referring now to FIG. 8, once the instrument (e.g., probe) 816 has been inserted into the rinse basin 808, and has been thoroughly cleansed, the liquid waste from the rinse basin (or basins) is pulled into the waste reservoir (104 of FIG. 1), where an embodiment may separate the liquid material from the air. In a further embodiment, the collected liquid from the waste reservoir may then be pumped out with a waste pump, such as that shown in FIG. 2 at 207. An embodiment may then pump the remaining air into an airstream and through a dryer (103 of FIG. 1). Using the dryer, an embodiment may provide a secondary air/liquid separation step, which ensures as little liquid as possible remains in the airstream. Additionally, in order to ensure a clean and sterile testing environment, the liquid maintained within the dryer may be contained, and not exhausted, into the environment. Additionally or alternatively, the liquid or liquid air mixture may be exhausted into the environment if it can be determined to have negative effects on the experiments or individuals carrying out the experiments. Alternatively, an embodiment may pass the exhaust through a filter or silencer system to remove particular and harmful components.

Accordingly, an embodiment comprising a rinse basin and a blower may significantly improve the ability to consistently and effectively clean testing instruments (e.g., probes) while minimizing reagent and water carryover to the following experiment. Additionally, in order to maintain a clean testing environment, the air source provided by the blower may be independent of other operations on the embodiment, thus providing consistent cleaning for the probes without contaminating the environment or the additional samples.

In one embodiment, multiple instruments (e.g., probes) are to be cleaned simultaneously, using a system similar to that shown in FIG. 3, without degradation on the ability to clean. Additionally, the waste reservoir 104 and dryer 103 systems may provide a mechanism to use high flowing air to pull liquid and separate/collect the liquid in the waste reservoir, allowing the air stream to be exhausted into the environment, free of liquid. Thus, in an embodiment, the dryer acts as a secondary air/liquid separator to ensure that liquid is not exhausted into the environment. In another embodiment, a rinse basin's single hole design may allow for the capture of overflow liquid through the top port. This design significantly simplifies the design for manufacturability, and also provides maximum liquid contact for better rinsing and better air flow to the instruments (e.g., probes) to evacuate the liquid and dry the probe.

Referring back to FIG. 1, an embodiment may have various device sensors (e.g., a capacitance sensor 106 as shown adjacent to the waste reservoir) for monitoring various characteristics of the system. Additional non-limiting examples of sensors within the system may include a pressure sensor connected to the waste reservoir and/or a tachometer monitoring the blower while in operation. In one embodiment, the sensors may be connected to a software system (e.g., clinical trial software), which may monitor each system. Based on the information received from the sensors, the software may alert a user (e.g., via an audio sound, visual indicator, etc.) if an error or abnormality occurs. Additionally or alternatively, the software system may directly take action(s) to rectify the potential error (e.g., adjust the blower speed, empty the waste reservoir, shut down the system, take the reagent probes offline, etc.).

As discussed herein, and illustrated in FIGS. 6 and 7, the basin may have an integrated or separate bracket 613/713. The bracket may be made out of a variety of materials (e.g., metal plastic, etc.), and be of varying levels of thickness (e.g., 1 mm, 2 mm, 5 mm, etc.). In one embodiment, the bracket may be tightly bent to a ninety (90) degree angle. By bending the bracket in a ninety (90) degree angle, an embodiment may be better able to provide adequate stiffness, which in turn reduces the complexity of the bracket itself (e.g., not requiring additional structural members or parts that may warp over time). Additionally, as shown in FIGS. 6 and 7, the bracket alignment may be adjustable (e.g., loosening the threads of the fastening device 614/714 shown in FIGS. 6 and 7).

Referring back to FIG. 8, in another embodiment, the surface of the bracket may be particularly sized (e.g., increased or decreased) to give it the correct amount of surface area to contact a complementary system. The complementary system may be, for example, a mating surface 817 on an incubation ring cover. In one embodiment, the alignment of the basin 808 may be carried out with a wash basin alignment tool 818. This wash basin alignment tool 818 enables an embodiment to center the top of the basin 808 as accurately as possible. Once the automatic alignment is completed (e.g., via the wash basin alignment tool 818), a second system may perform a manual alignment check. A non-limiting example of a reagent probe being placed in the wash basin as a manual alignment check is shown in FIG. 8. This manual alignment check verifies that the basin has adequate clearances throughout the basin.

Referring back to FIG. 1, an embodiment may have an air vent or exhaust port system (not shown), which may be located near a vacuum pump exhaust area as shown in FIG. 1. The location selection of the air vent may allow for easier accessibility for the exhaust tube system 105 without requiring sharp bends in the tubes, which may reduce performance. In a further embodiment, the vent location may be located where the chassis is constructed of a single wall instead of double wall. Selecting a location with a single wall allows the exhaust air to exit openly to the bottom of the system without additional obstructions in the flow path.

Additionally, the exhaust air may be blown out at an angle (e.g., towards the back of the instrument) due to the routing of the tubing system. Blowing the exhaust air out at an angle may help prevent back pressure from building up. Moreover, flow testing has demonstrated that an embodiment may benefit from ensuring the exhaust is a minimum of one (1) inch away from the floor, as it helps to prevent flow decrease at the rinse basin. The selected location may have a large impact on the rinse basin (e.g., it may experience a large flow drop in the system due to the selected location).

Figure 9:
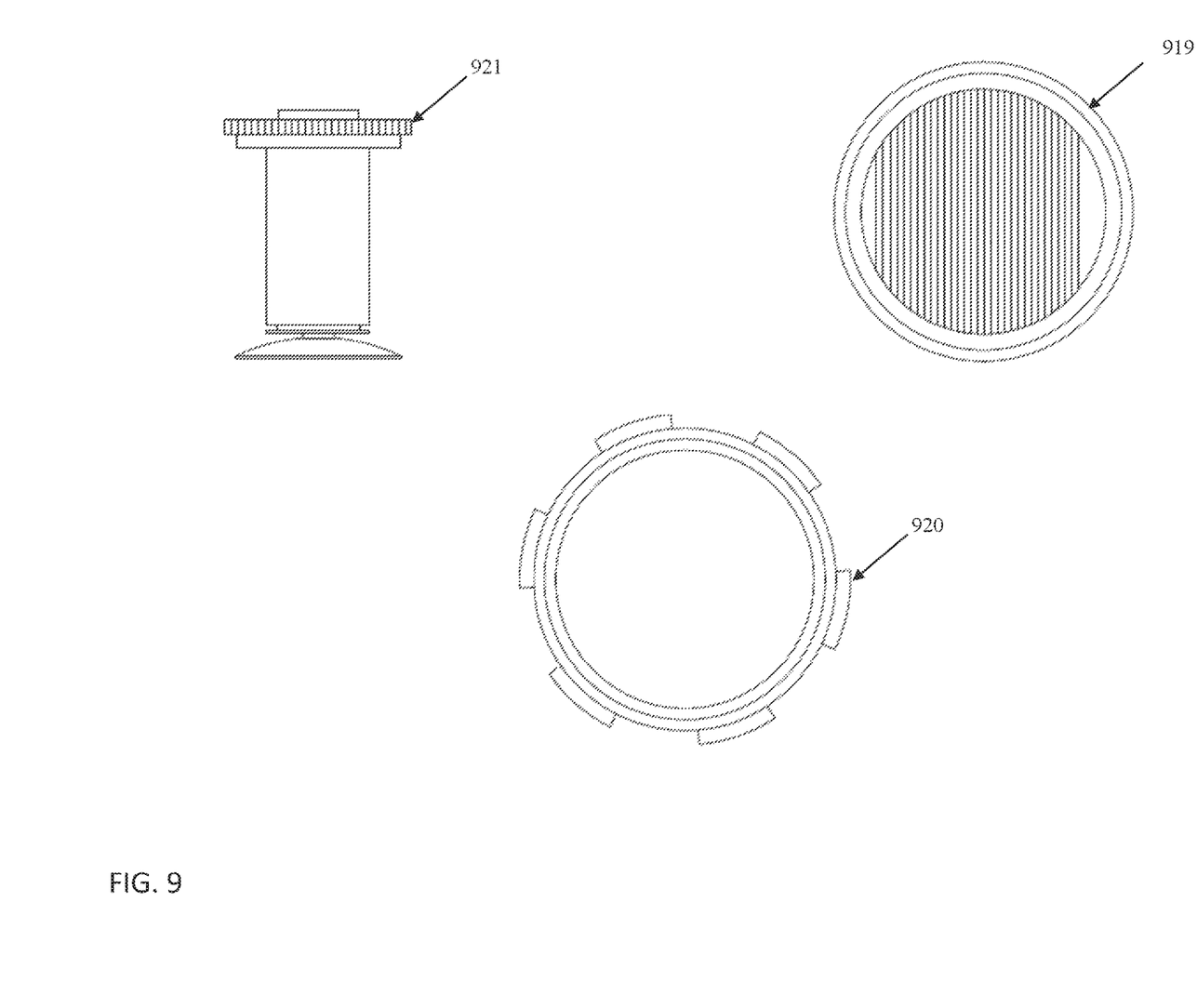
FIG. 9 is an illustrative view of an example filter/silencer.

In a further embodiment, a silencer or filter 101 may be attached to the system to minimize both the noise pollution as well as the particulate that may be released from the system. A non-limiting illustrative example of the components of a filter system that may be attached to the system are shown at FIG. 9. The silencer/filter system may comprise a physical filter 919, which may be housed in an interlocking housing 920. The interlocking housing 920, may also comprise a valve system 921 to prevent back flow.

In some embodiments, a pipette is rinsed using a solvent or water prior to being inserted into the rinse basin. In some embodiments, the rinse basin is filled with water (or other suitable solvent) from the water reservoir before or after a pipette is inserted into the basin. The pipette can sip and spit the water to clean the inside of the pipette. Afterwards, the water is evacuated and the above mentioned drying procedure is applied.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A high speed air system configured to clean a pipette comprising:
    a mechanical high speed air system;
    a rinse basin configured to receive the pipette comprising:
        a hollow tube enclosed at one end,
        wherein the hollow tube comprises an upper port, a lower port, and a lower port tube from the hollow tube to the lower port,
        the lower port tube being tapered toward the hollow tube, and
        wherein the rinse basin is connected to the mechanical high speed air system at the upper port;
    a waste reservoir that upon receiving a waste product comprising: air and liquid, separates the liquid from the air; and
    a dryer that receives the air from the waste reservoir and further separates any remaining liquid from the air;
    wherein the high speed air system receives the air from the dryer and exhausts the air.

2. The system of claim 1, further comprising at least one sensor.

3. The system of claim 2, wherein the at least one sensor comprises one of: a capacitance sensor, a pressure sensor, and a tachometer sensor.

4. The system of claim 1, further comprising a silencer, wherein the silencer is connected to the mechanical high speed air system to reduce a noise level of the mechanical high speed air system during operation.

5. The system of claim 1, further comprising at least one exhaust port, wherein the at least one exhaust port has at least one inch of unobstructed exhaust space beneath the exhaust port.

6. A rinse basin and high speed air system configured to clean a pipette comprising:
    a mechanical high speed air system;
    a rinse basin comprising:
        a hollow tube enclosed at one end, wherein the hollow tube comprises an upper port, a lower port, and a lower port tube from the hollow tube to the lower port, the lower port tube being tapered toward the hollow tube, and wherein the rinse basin is connected to the mechanical high speed air system at the upper port;

a waste reservoir that receives, from the rinse basin, a waste product comprising: air and liquid, wherein the waste reservoir separates the liquid from the air; and a dryer that receives the air from the waste reservoir and further separates any remaining liquid from the air;

wherein the high speed air system receives the air from the dryer and exhausts the air.

7. The system of claim 6, wherein the rinse basin comprises a plurality of rinse basins.

8. The system of claim 6, wherein the mechanical high speed air system further comprises at least one sensor.

9. The system of claim 8, wherein the at least one sensor comprises one of: a capacitance sensor, a pressure sensor, and a tachometer sensor.

10. The system of claim 6, wherein the rinse basin further comprises a bracket; and wherein the bracket allows adjustment of a rinse basin alignment.

11. The system of claim 10, wherein the bracket is at least one of: integrated with the rinse basin and attachable to the rinse basin.

12. The system of claim 10, wherein the bracket comprises a surface shaped complementary to an incubation ring cover.

13. The system of claim 10, wherein the bracket is bent at a ninety degree angle.

14. The system of claim 6, further comprising a silencer, wherein the silencer is connected to the mechanical high speed air system to reduce a noise level of the high speed air system during operation.

* * * * *